Aug. 1, 1939.   F. A. FOX   2,167,943
STEERING MECHANISM
Filed Aug. 20, 1937   3 Sheets-Sheet 3
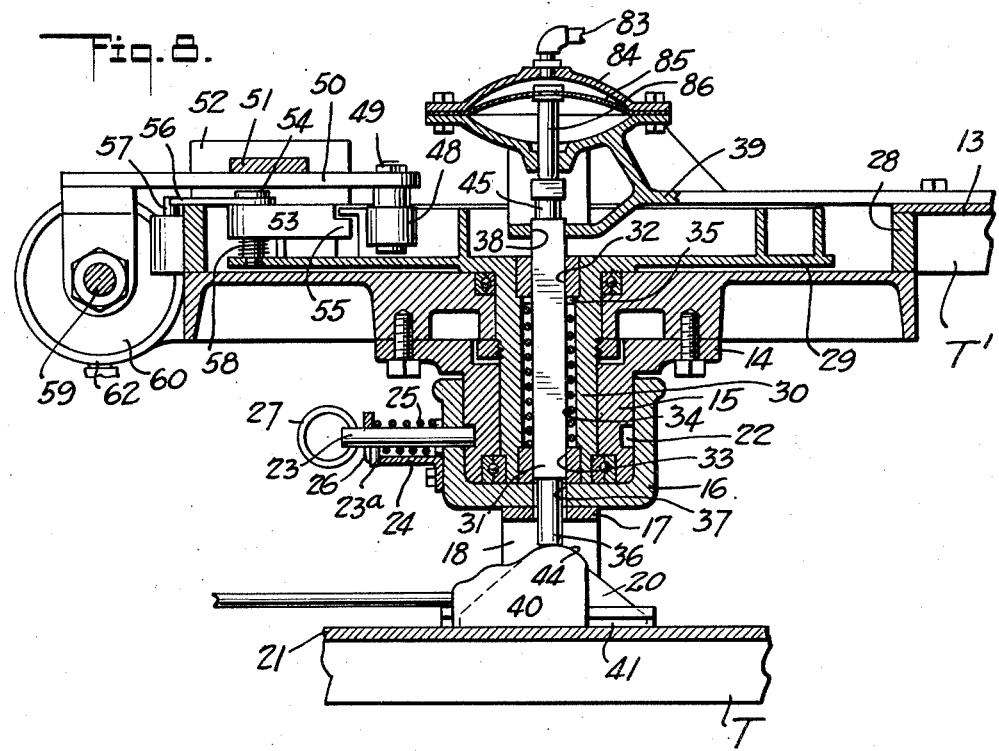
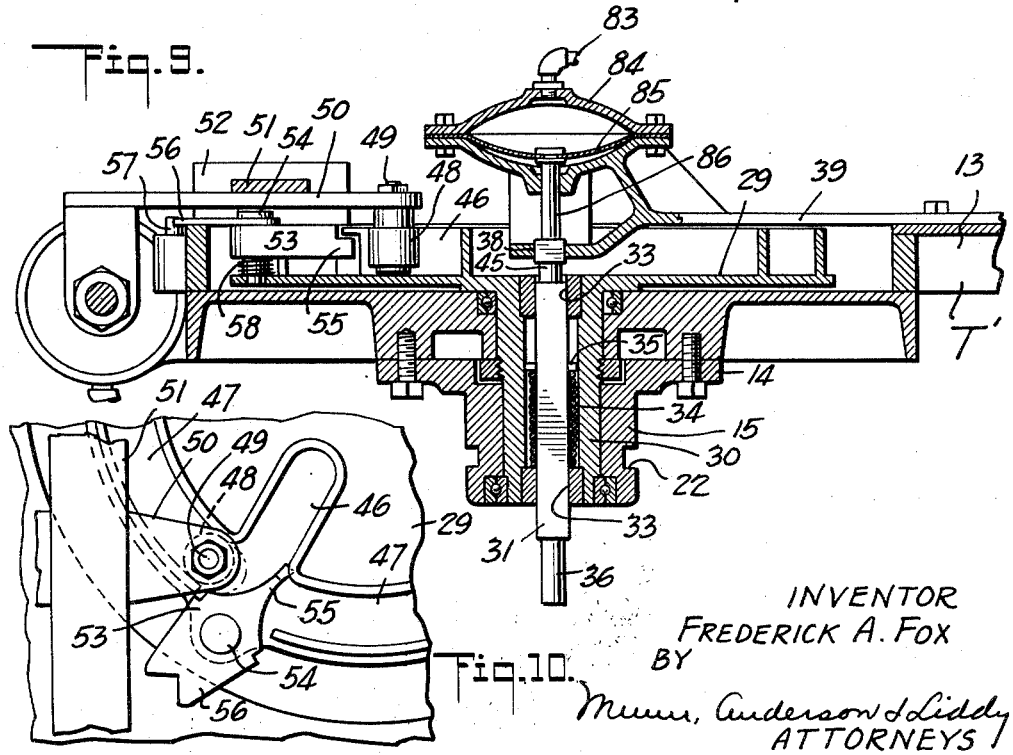
INVENTOR
FREDERICK A. FOX
BY
Munn, Anderson & Liddy
ATTORNEYS Patented Aug. 1, 1939

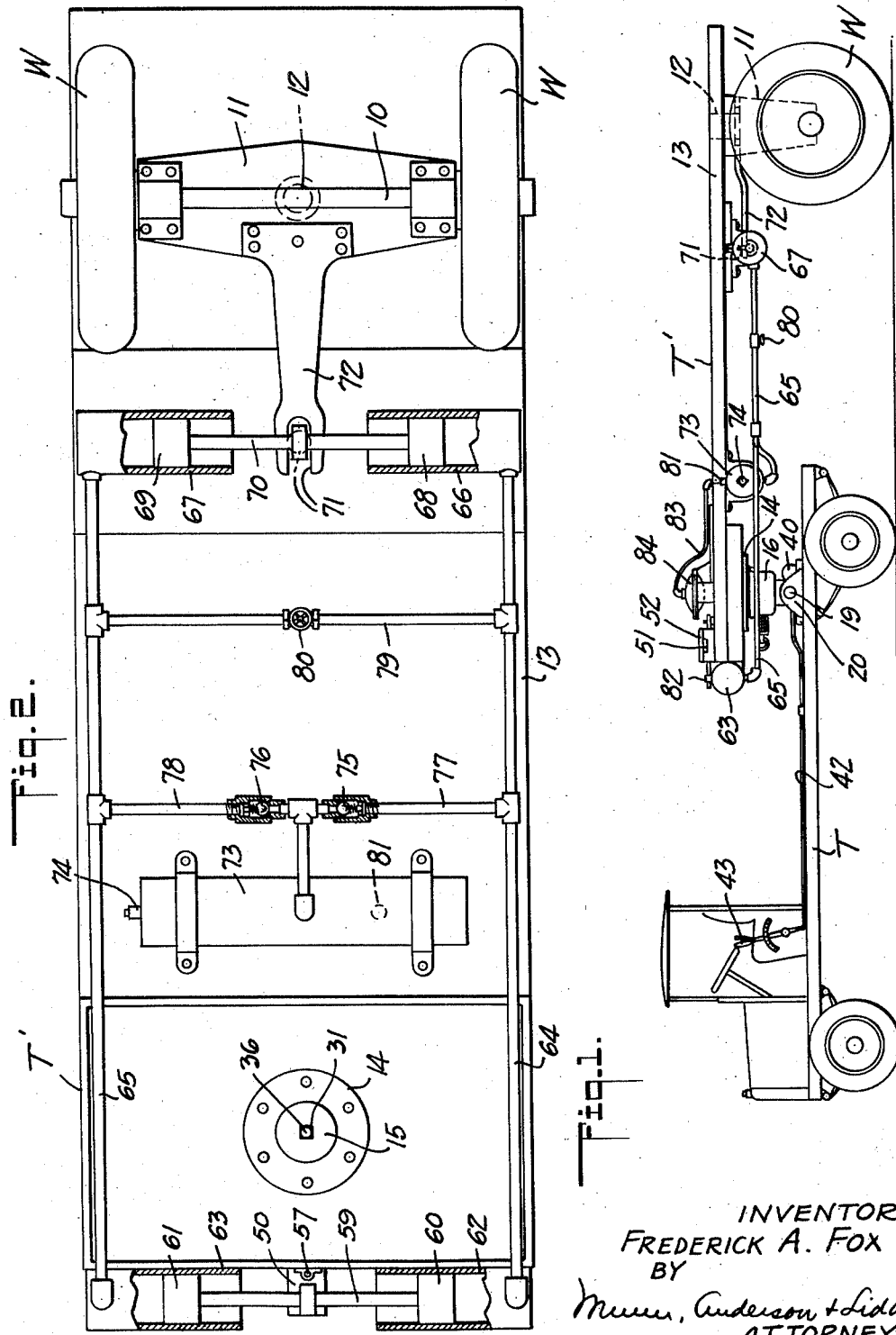

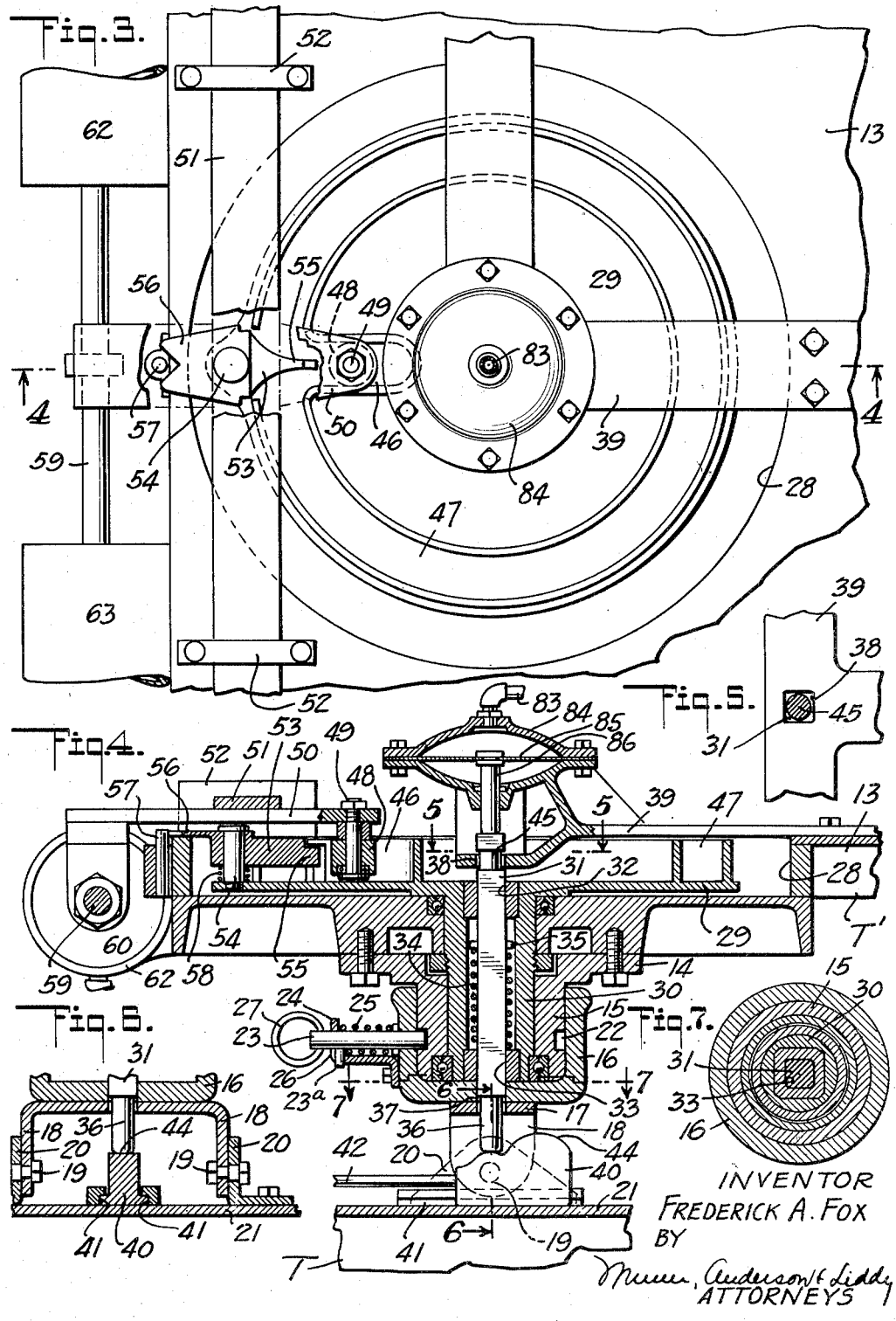

2,167,943

UNITED STATES PATENT OFFICE 2,167,943

STEERING MECHANISM

Frederick A. Fox, Glendale, Calif.

Application August 20, 1937, Serial No. 160,078

16 Claims. (Cl. 280—33.5)

This invention relates generally to steering mechanisms for vehicles, and more particularly to steering mechanisms between towing and towed vehicles, by which the wheels of the towed vehicle are caused to "track" or follow the paths of the wheels of the towing vehicle in making turns.

An object of the invention is to provide a steering mechanism which is structurally characterized to positively steer the towed vehicle automatically in such relationship to the steering movements of the towing vehicle as to enable relatively sharp turns to be executed, and which automatically ceases its steering effect upon the towed vehicle when a predetermined maximum steered position of the towed vehicle is reached, all in a manner to limit the steered position of the wheels of the towed vehicle from a straight ahead position and yet permit further independent steering movement of the towing vehicle while the wheels of the towed vehicle are locked in their maximum steered position, whereby to greatly facilitate maneuvering of the towed vehicle in backing operations and "spotting" of the towed vehicle in restricted spaces.

Another object is to provide a steering mechanism of the above described character which can be manually rendered operative to steer the towed vehicle as aforestated, or rendered incapable of operation, in which latter condition the towed vehicle can be backed into acute angular positions relative to the towing vehicle while the wheels of the towed vehicle are maintained locked in a straight ahead position.

A further object is to provide a steering mechanism which, upon disconnecting the towed vehicle from the towing vehicle, will automatically lock the wheels of the towed vehicle preferably in a straight ahead position so as to enable such vehicle to be used in conjunction with another towing vehicle without the necessity of manual adjustments of the steering mechanism.

A still further object is to provide a steering mechanism in which a hydraulic system is responsive to steering movement of the towing vehicle to accordingly steer the wheels of the towed vehicle in order to negotiate relatively sharp turns, and in which the hydraulic system embodies a liquid reservoir under fluid pressure tending to constantly supply liquid to the system to compensate for any leakage of liquid therefrom.

Another object is to provide a steering mechanism in which means is responsive to fluid pressure in the hydraulic system to lock the wheels of the towed vehicle against steering movement when the vehicles are uncoupled, and in which mechanical means is provided to perform the same function should the fluid pressure fail, all to the end of insuring control over the steerable wheels of the towed vehicle under any and all conditions.

With these and other objects in view, the invention consists in the combinations and arrangements of elements as set forth in the following specification and particularly pointed out in the appended claims.

In the accompanying drawings,

Figure 1 is a view in side elevation showing towing and towed vehicles embodying this invention, and coupled together;

Figure 2 is a bottom plan view of the towed vehicle uncoupled from the towing vehicle;

Figure 3 is an enlarged fragmentary plan view of a portion of the towed vehicle;

Figure 4 is a vertical sectional view taken on the line 4—4 of Figure 3;

Figures 5, 6 and 7 are detail sectional views taken, respectively, on the lines 5—5, 6—6 and 7—7 of Figure 4;

Figures 8 and 9 are views similar to Figure 4, but illustrating different positions occupied by the steering mechanism;

Figure 10 is a fragmentary plan view similar to Figure 3, but illustrating a different position of the steering mechanism.

Referring specifically to the drawings, the invention is shown associated with a towing vehicle T and a vehicle T' to be towed thereby, the towing vehicle being in the form of a conventional motor power unit controlled by an operator, and the towed vehicle being in the form of a semi-trailer in which its single pair of rear wheels W—W are rotatably mounted on a dead axle 10 supported by a bearing bracket 11 and a king pin 12 to swivel about a vertical axis on the body 13 of the trailer so as to render the wheels W—W steerable as a unit.

Fixed to the underside of the body 13 adjacent its forward end is a bracket 14 having a depending sleeve 15 functioning as a king pin and adapted to rotatively seat in a socket 16 secured on a yoke 17, the depending arms 18 of which are pivotally connected at 19 to brackets 20—20 fixed to the body 21 of the towing vehicle T adjacent its rear end. The socket 16 is thus pivotally mounted on the towing vehicle to rock about a horizontal axis transversely related thereto so as to permit relative vertical movements of the vehicles when traveling on the road without affecting the vertically disposed pivotal coupling provided by the sleeve 15 and socket 16 between the vehicles.

The sleeve 15 is provided peripherally with an annular groove 22 adapted to freely receive the inner end of a connector pin 23 passing through an opening in the socket 16 and rotatably and slidably mounted in a bracket 24 fixed to the socket. A spring 25 normally urges the pin 23 inwardly of the socket, in which position of the connector pin a stop pin 23a thereon enters a slot 26 in the bracket 24 to limit the advanced position of the connector pin under the action of the spring. A finger loop 27 on the connector pin enables the latter to be manually retracted until the stop pin 23a clears the slot 26, following which the connector pin can be retained in retracted position with its inner end clear of the groove 22, by rotating the connector pin to engage the stop pin with the outer end of the bracket 24. The vehicles can thus be detachably coupled pivotally about a vertical axis and can be readily locked against uncoupling, or released for uncoupling by raising the forward end of the trailer by suitable jacks (not shown).

Co-axially related to the sleeve 15, the body 13 is provided with a circular recess 28 receiving a cam 29 having a depending hub 30 journaled in the sleeve 15 to mount the cam for rotary movement on the towed vehicle. A drive shaft 31 which is square or of other non-circular form in cross section is mounted in non-circular openings 32 and 33 in the hub, so as to be compelled to rotate with the cam, yet be axially movable. A relatively light spring 34 surrounding the shaft 31 co-acts with a pin 35 thereon to urge the shaft upwardly to one extreme position axially in a manner to be later described. It will be noted from Figure 8 that in this extreme position of adjustment, the reduced lower end 36 of the shaft 31 disrupts an operative connection provided between the shaft and the socket 16 by a non-circular opening 37 in the latter with which the non-circular portion of the shaft otherwise co-acts as is shown in Figure 4.

Furthermore, in this upper extreme position of the shaft, it co-acts with a non-circular opening 38 in a bracket 39 fixed to the body 13, to lock the shaft thereto and thus prevent rotation of the cam 29, while permitting steering movement of the towing vehicle T without affecting the shaft.

The shaft 31 can be positively moved to and maintained in its upper extreme position of axial adjustment by a controller 40 reciprocally mounted in guideways 41—41 on the body 21 beneath the yoke 17. The controller is connected by a rod 42 to an operating lever 43 conveniently located to the operator, and is provided with a cam surface 44 concentrically related to the axis 19 when the controller occupies the extreme forward position shown in Figure 8, for co-action of such cam surface with the reduced lower end 36 of the shaft 31 in maintaining the latter in its upper extreme position irrespective of relative pivotal movement of the vehicles about the axis 19. In the extreme rearward position of the controller shown in Figure 4, the shaft 31 is adapted to occupy an intermediate position of axial adjustment wherein a second reduced portion 45 adjacent the upper end of the shaft disrupts the operative connection between the fixed bracket 39 and the shaft. In this intermediate position of the shaft, the operative connection between the shaft and the socket 16 is restored so that steering movements of the towing vehicle will be transmitted to the cam 29 through the shaft, all for a purpose to be later fully described.

The cam 29 is provided with an active portion in the form of a radially extending groove 46, the outer end of which communicates with an annular groove 47 constituting a dwell portion of the cam. A roller 48 is adapted to work in the grooves 46 and 47, and is rotatably mounted on a vertical pin 49 fixed to a cross arm 50 of a crosshead 51, reciprocably mounted for movement transversely of the towed vehicle in bearings 52 secured to the body 13.

A switching member 53 is pivoted on the cam 29 directly opposite the outer end of the radial groove 46, by a vertical pin 54, and is provided at one end with a switch point 55 adapted to switch the roller 48 into the radial groove 46 from the annular groove 47. The opposite end of the switching member terminates in a yoke 56, the arms of which are adapted to co-act with a fixed pin 57 on the body 13, to shift the switching member to one switching position or the other during rotation of the cam, all in a manner to be later described in detail. A spring 58 on the pivot pin 54 frictionally retains the switching member in the position to which it is adjusted.

The crosshead 51 is rigidly connected by its cross arm 50 to a piston rod 59 having pistons 60 and 61 working in right and left hand cylinders 62 and 63, respectively, fixed to the forward end of the body 13 and constituting part of a hydraulic system by which rotary movement of the cam 29 is caused to be transmitted to the wheels W—W to steer the latter in accordance with steering movements of the towing vehicle T.

Conduits 64 and 65, respectively, place the cylinders 62 and 63 in communication with other right and left hand cylinders 66 and 67, respectively, fixed beneath the body 13 in advance of the wheels W, and having working therein pistons 68 and 69 fixed to a piston rod 70. The piston rod 70 has a pin and slot connection 71 with an arm 72 rigidly projecting from the bearing bracket 11, so that as the rod is actuated, the wheels W—W will be accordingly steered as a unit about the axis of the king pin 12.

A liquid supply tank 73 is fixed to the body 13 and is initially placed under a suitable fluid pressure through an air valve 74 so that liquid in the tank will constantly tend to discharge therefrom past check valves 75 and 76 in branch conduits 77 and 78 connected, respectively, to the conduits 64 and 65 to compensate for any leakage of liquid from the system. A by-pass conduit 79 having a valve 80 therein, also connects the conduits 64 and 65 and enables an initial adjustment of the wheels W—W to be effected when the valve 80 is open, following which such valve is closed to retain the adjustment. The tank 73 is provided with a removable filler plug 81 to enable liquid to be supplied thereto. The several cylinders 62, 63 and 66, 67 are likewise provided with filler plugs 82 to enable the system to be freed of air during the filling operation so as to insure that liquid will fill all unoccupied space in the system.

From the tank 73 leads a pipe 83 to a casing 84 rigidly supported above the shaft co-axially thereof by the bracket 39, and containing a flexible diaphragm 85 connected to an actuating pin 86 which bears against the upper end of the shaft 31 and constantly tends to move the shaft to its lower extreme position of axial adjustment under the action of the air pressure in the tank 73 imposed upon the diaphragm. It will be understood that the pressure of the air is ample to overcome the loading of the spring 34 so that as long as the predetermined air pressure is present, the spring will be incapable of operating as intended.

The operation of the invention is as follows: Let it be assumed that the vehicles T and T' are coupled, and that the controller 40 has been adjusted to the position shown in Figure 4, so that under the air pressure in the tank 73, the pin 86 of the diaphragm 85 will maintain the shaft 31 in its intermediate position axially. It will be remembered that in this intermediate position of the shaft, it will be operatively connected to the socket 16 through the non-circular opening 37 thereof, and will be disconnected from the non-circular opening 38 in the bracket 39 by the reduced portion 45 of the shaft. Thus the shaft 31 and hence the cam 29 will be rotated in accordance with steering movements of the towing vehicle T.

With the mechanism in this condition and occupying a straight-ahead steering position, the roller 48 will be disposed in the radial groove 46. Upon steering the towing vehicle T to the right or left from the straight-ahead position, the groove 46 will co-act with the roller 48 in moving the crosshead 51 in the corresponding direction and thus correspondingly actuate the piston rod 59. Through the medium of the liquid in the conduits 64 and 65, the piston rod 70 will be reversely moved and will co-act with the arm 72 of the bracket 11 in steering the wheels W—W about the king pin 12 a sufficient amount for the wheels to "track" or follow the path of the wheels of the towing vehicle T so as to enable relatively sharp turns to be negotiated.

As the steering movement of the towing vehicle increases, it will be apparent that the roller 48 moves towards the outer end of the groove 46, and it will be noted that in one practical embodiment of the invention the length of the groove 46 is calculated so that when the wheels W—W have been thus steered through an angle of fifteen degrees from the straight-ahead position, the roller reaches the outer end of the groove 46 and enters the groove 47.

Further steering movement of the towing vehicle in the same direction will be ineffective to further steer the wheels W—W which will be maintained locked in the predetermined maximum steered position of fifteen degrees from straight-ahead position, by the co-action of the annular dwell groove 47 and the roller 48.

Upon rotation of the cam 31 from its central position corresponding to a straight-ahead steering position of the towing vehicle, the fixed pin 57 on the body 13 will co-act with the yoke 56 of the switching member 53 to rock the latter from its intermediate position shown in Figure 3, towards that side of the groove 46 in which the switch point 55 will be in the path of the return movement (Figure 10) of the roller 48 from the annular dwell groove 47 to the radial active groove 46 when the steering movement of the towing vehicle is reversed to again occupy a straight-ahead steering position.

However, in order to insure that the yoke will properly co-act with the pin 57 in switching the member 53, the pin only partially moves the switching member towards one extreme switching position or the other, the movement of the switching member being completed by the roller 48 in striking the switch point 55 as the roller leaves the groove 46, thus positively clearing from the pin 57 that arm of the yoke 56 which is the leading arm upon steering movement of the towing vehicle towards straight-ahead steering position. Therefore, the switching member will be positively reversed to the proper switching position to return the roller to the groove 46 when the towing vehicle is again steered past straight-ahead steering position.

It will be clear that when the roller 48 is working in the dwell groove 47, the wheels W—W will be positively locked in the predetermined maximum steered position through the medium of the hydraulic system, while permitting further steering movement of the towing vehicle independently of the towed vehicle, and that when the roller is working in the active groove 46, the wheels W—W will be under the direct control of the towing vehicle to "track" or follow the paths of its wheels.

When the controller 40 is shifted to the position shown in Figure 8, and with the vehicles in alined relationship, the shaft 31 will be moved by the cam surface 44 against the air pressure in the tank 73 to occupy its upper extreme position of axial adjustment in which the shaft will be locked to the bracket 39 and will be unlocked from the socket 16 by the reduced lower end 36 of the shaft. As the cam 29 is now locked against rotation, and as the operative connection between the towing vehicle and shaft is disrupted, steering movements of the towing vehicle will be ineffective to steer the wheels W—W of the towed vehicle, which will be maintained locked in straight-ahead position through the medium of the hydraulic system and the co-action between the roller 48 and the active groove 46 of the cam. The towing vehicle can thus be steered independently of the wheels W—W in order to enable the vehicles to be backed into acute angular relationships with the wheels of the towed vehicle locked in straight-ahead steering position.

Upon uncoupling the towed vehicle from the towing vehicle in alined relationship, the pressure of air in the tank 73 will re-act upon the diaphragm 85 to force the shaft 31 to its lower extreme position of axial adjustment shown in Figure 9, so that the upper non-circular end of the shaft will co-act with the non-circular opening 38 of the bracket 39 to lock the cam 29 against rotation and hence lock the wheels W—W in straight-ahead position.

Should the air pressure fail or be reduced below the loading of the spring 34, the latter will move the shaft 31 to its upper extreme position of axial adjustment when the vehicles are in alined relationship, whereby to maintain the cam 29 locked against rotation and the wheels W—W locked in straight-ahead position, to thereby insure that the steering movements of the wheels of the towed vehicle will be safely controlled under any and all circumstances.

It will be noted that the steering connection provided between the towing and towed vehicles by the cam 29 and roller 48 is irreversible so that any tendency of the wheels W—W of the towed vehicle to change their steered position will be positively prevented, thus insuring that the wheels will be automatically locked in any position to which they are steered.

What is claimed is:

1. Steering mechanism comprising means for coupling a vehicle having steerable rear wheels to a towing vehicle; means responsive to steering movement of the towing vehicle, to accordingly steer the rear wheels of the towed vehicle; means adapted for co-action with the second means to prevent operation thereof in response to steering movement of the towing vehicle, and with the rear wheels of the towed vehicle locked in a straight-ahead position; and manually operable means on the towing vehicle operatively connected to the last means for actuation of the latter from a point on the towing vehicle.

2. Steering mechanism comprising means for detachably coupling a vehicle having steerable wheels to a towing vehicle; means responsive to steering movement of the towing vehicle, to accordingly steer the wheels of the towed vehicle; and means co-acting with the last means to automatically lock the wheels of the towed vehicle in straight-ahead position upon disconnection of the towed vehicle from the towing vehicle.

3. Steering mechanism comprising means including a shaft for pivotally connecting a vehicle having steerable wheels to a towing vehicle; a cam mounted on the towed vehicle co-axially of said shaft and operatively connected thereto to be rotated in response to steering movement of the towing vehicle; the cam having an active portion and a dwell portion; means mounted on the towed vehicle and co-actable with the cam to be moved by the active portion thereof during a predetermined steering movement of the towing vehicle in either direction from a straight-ahead position, and to be retained by the dwell portion against movement during steering movement of the towing vehicle in excess of said predetermined steering movement; and means co-acting with the last means to steer the wheels of the towed vehicle in accordance with the movement of the last means.

4. Steering mechanism comprising means including a shaft for pivotally connecting a vehicle having steerable wheels to a towing vehicle; a cam mounted on the towed vehicle co-axially of said shaft and operatively connected thereto to be rotated in response to steering movement of the towing vehicle; the cam having an active portion and a dwell portion; means mounted on the towed vehicle and co-actable with the cam to be moved by the active portion thereof during a predetermined steering movement of the towing vehicle in either direction from a straight-ahead position, and to be retained by the dwell portion against movement during steering movement of the towing vehicle in excess of said predetermined steering movement; means co-acting with the last means to steer the wheels of the towed vehicle in accordance with the movement of the last means; and means by which the operative connection between the vehicles through the medium of the shaft and cam can be disrupted so as to permit steering movement of the towing vehicle without affecting the wheels of the towed vehicle.

5. Steering mechanism comprising means including a shaft for pivotally connecting a vehicle having steerable wheels to a towing vehicle; a cam mounted on the towed vehicle co-axially of said shaft and operatively connected thereto to be rotated in response to steering movement of the towing vehicle; the cam having an active portion and a dwell portion; means mounted on the towed vehicle and co-actable with the cam to be moved by the active portion thereof during a predetermined steering movement of the towing vehicle in either direction from a straight-ahead position, and to be retained by the dwell portion against movement during steering movement of the towing vehicle in excess of said predetermined steering movement; means co-acting with the last means to steer the wheels of the towed vehicle in accordance with the movement of the last means; means by which the operative connection between the vehicles through the medium of the shaft and cam can be disrupted so as to permit steering movement of the towing vehicle without affecting the wheels of the towed vehicle; and means operable to lock the wheels of the towed vehicle against steering movement when the aforestated operative connection between the vehicles is disrupted.

6. Steering mechanism comprising means including a shaft for pivotally connecting a vehicle having steerable wheels to a towing vehicle; a cam mounted on the towed vehicle co-axially of said shaft and operatively connected thereto to be rotated in response to steering movement of the towing vehicle; means co-acting with said cam to steer the wheels of the towed vehicle in accordance with the steering movements of the towing vehicle; and means co-acting with the last means to lock the wheels of the towed vehicle against steering movement when the towing vehicle is steered beyond a predetermined maximum position from a straight-ahead position.

7. Steering mechanism comprising means including a shaft for pivotally coupling a vehicle having steerable wheels to a towing vehicle; a cam co-axially related and slidably keyed to said shaft; means adapted to mount said shaft and cam on the towed vehicle for rotation as a unit; means for operatively connecting the shaft to the towing vehicle to rotate in accordance with steering movements thereof; means responsive to rotational movements of the cam by the shaft, to steer the wheels of the towed vehicle in accordance with the steering movements of the towing vehicle; and means co-acting with the cam to lock the wheels of the towed vehicle against steering movement when moved to a predetermined position from a straight-ahead position.

8. Steering mechanism comprising means including a shaft for pivotally coupling a vehicle having steerable wheels to a towing vehicle; a cam co-axially related and slidably keyed to said shaft; means adapted to mount said shaft and cam on the towed vehicle for rotation as a unit; means for operatively connecting the shaft to the towing vehicle to rotate in accordance with steering movements thereof; means responsive to rotational movements of the cam by the shaft, to steer the wheels of the towed vehicle in accordance with the steering movements of the towing vehicle; means for disrupting the operative connection between the shaft and towing vehicle by axially moving the shaft; and means for locking the shaft against rotation on the towed vehicle when said operative connection is disrupted, for co-action of the cam and steering means in locking the wheels of the towed vehicle against steering movement.

9. Steering mechanism comprising means including a shaft for pivotally coupling a vehicle having steerable wheels to a towing vehicle; a cam co-axially related and slidably keyed to said shaft; means adapted to mount said shaft and cam on the towed vehicle for rotation as a unit; means for operatively connecting the shaft to the towing vehicle to rotate in accordance with steering movements thereof; means responsive to rotational movements of the cam by the shaft, to steer the wheels of the towed vehicle in accordance with the steering movements of the towing vehicle; and means for locking the cam against rotation upon uncoupling the shaft from the towing vehicle, for co-action of the cam and last means in locking the wheels of the towed vehicle against steering movement.

10. Steering mechanism comprising means including a shaft for pivotally coupling a vehicle having steerable wheels to a towing vehicle; a cam co-axially related and slidably keyed to said shaft; means adapted to mount said shaft and cam on the towed vehicle for rotation as a unit; means for operatively connecting the shaft to the towing vehicle to rotate in accordance with steering movement thereof; means responsive to rotational movements of the cam by the shaft, to steer the wheels of the towed vehicle in accordance with the steering movements of the towing vehicle; manually operable means on the towing vehicle by which axial movement of the shaft from one position to another can be effected; means for locking the shaft rotationally to the towing vehicle and unlocking the shaft rotationally from the towed vehicle when the shaft occupies one of said positions, and means for unlocking the shaft rotationally from the towing vehicle and locking the shaft rotationally to the towed vehicle when the shaft occupies the other of said positions.

11. Steering mechanism comprising means for pivotally coupling a vehicle having steerable wheels to a towing vehicle; a rotatably mounted cam on the towed vehicle; means operatively connecting said cam to the towing vehicle to rotate in accordance with steering movements of the latter; said cam having active and dwell portions; driven means on the towed vehicle co-actable with the active portion to be moved thereby when the cam is rotated through a predetermined angle, and co-actable with the dwell portion when the cam has been rotated in excess of the predetermined angle, to cease movement of the driven means and to lock the latter against movement; and means responsive to movement of the driven means by the cam, to effect steering movement of the wheels of the towed vehicle.

12. Steering mechanism comprising means for pivotally coupling a vehicle having steerable wheels to a towing vehicle; a rotatably mounted cam on the towed vehicle; means operatively connecting said cam to the towing vehicle to rotate in accordance with steering movements of the latter; said cam having active and dwell portions; driven means on the towed vehicle co-actable with the active portion to be moved thereby when the cam is rotated through a predetermined angle, and co-actable with the dwell portion when the cam has been rotated in excess of the predetermined angle, to cease movement of the driven means; means responsive to movement of the driven means by the cam, to effect steering movement of the wheels of the towed vehicle; and means for returning the driven means from said dwell portion to said active portion of the cam during reverse rotation thereof to a position within said predetermined angle.

13. Steering mechanism comprising means for pivotally coupling a vehicle having steerable wheels to a towing vehicle; a rotatably mounted cam on the towed vehicle; means operatively connecting said cam to the towing vehicle to rotate in accordance with steering movements of the latter; said cam having active and dwell portions; driven means on the towed vehicle co-actable with the active portion to be moved thereby when the cam is rotated through a predetermined angle and co-actable with the dwell portion when the cam has been rotated in excess of the predetermined angle, to cease movement of the driven means; means responsive to movement of the driven means by the cam, to effect steering movement of the wheels of the towed vehicle; a switching member for the driven means; and means co-actable with the switching member to cause the latter to direct the driven means from the dwell portion to the active portion of the cam during reverse rotation thereof to a position within said predetermined angle.

14. Steering mechanism comprising means for coupling a vehicle having steerable wheels to a towing vehicle; means including a hydraulic system responsive to steering movement of the towing vehicle, to accordingly steer the wheels of the towed vehicle; said system including a liquid reservoir under fluid pressure tending to supply liquid to the system to compensate for loss of liquid by leakage from the system; and means operable by fluid under pressure in said reservoir to lock the wheels of the towed vehicle against steering movement upon uncoupling the vehicles in a predetermined steering relationship.

15. Steering mechanism comprising means for coupling a vehicle having steerable wheels to a towing vehicle; means including a hydraulic system responsive to steering movement of the towing vehicle, to accordingly steer the wheels of the towed vehicle; said system including a liquid reservoir under fluid pressure tending to supply liquid to the system to compensate for loss of liquid by leakage from the system; means operable by fluid under pressure in said reservoir to lock the wheels of the towed vehicle against steering movement upon uncoupling the vehicles in a predetermined steering relationship; and means co-acting with the last means in the event that the fluid pressure should fail, to lock the wheels of the towed vehicle against steering movement and permit independent steering of the towing vehicle.

16. Steering mechanism comprising means including a shaft for pivotally connecting a vehicle having steerable wheels to a towing vehicle; means mounting the shaft on one vehicle for rotation and movement axially, means for adjusting the shaft axially to occupy two different positions; and means coacting with the shaft to steer the wheels of the towed vehicle in accordance with steering movements of the towing vehicle, or enable the towing vehicle to be steered independently of the towed vehicle with the wheels of the latter locked against steering movement, according as the shaft occupies one or the other of said axially adjusted positions.

FREDERICK A. FOX.